(12) United States Patent
Plews (10) Patent No.: US 9,631,609 B2
(45) Date of Patent: Apr. 25, 2017

(54) PROPULSION SYSTEM

(71) Applicant: Dennis J. Plews, Sarasota, FL (US)

(72) Inventor: Dennis J. Plews, Sarasota, FL (US)

( * ) Notice: Subject to any disclaimer, the term of this patent is extended or adjusted under 35 U.S.C. 154(b) by 0 days.

(21) Appl. No.: 14/498,654

(22) Filed: Sep. 26, 2014

(65) Prior Publication Data

US 2016/0363112 A1    Dec. 15, 2016

Related U.S. Application Data

(63) Continuation-in-part of application No. 11/514,405, filed on Aug. 30, 2006, now Pat. No. 8,863,597.

(51) Int. Cl.
*F03G 3/00*      (2006.01)
*F16H 33/20*    (2006.01)

(52) U.S. Cl.
CPC ............... *F03G 3/00* (2013.01); *F16H 33/20* (2013.01)

(58) Field of Classification Search
CPC .......................................................... F03G 3/00
See application file for complete search history.

(56) References Cited

U.S. PATENT DOCUMENTS

| | | | |
|---|---|---|---|
| 2,009,780 A | 7/1935 | Laskowitz | |
| 3,025,841 A | 3/1962 | Beckham | |
| 3,584,515 A | 6/1971 | Matyas | |
| 3,807,244 A | 4/1974 | Estrade | |
| 3,935,752 A | 2/1976 | Kelbel et al. | |
| 3,968,700 A | 7/1976 | Cuff | |
| 3,998,107 A | 12/1976 | Cuff | |
| 4,744,259 A | 5/1988 | Peterson | |

(Continued)

FOREIGN PATENT DOCUMENTS

FR      86402 E      2/1966

OTHER PUBLICATIONS

Gary Taubes, Schizophrenic Atom Doubles As Schrodinger's Cat-or Kitten, Research News, May 24, 1996, p. 1101, vol. 272.

(Continued)

*Primary Examiner* — Terence Boes
(74) *Attorney, Agent, or Firm* — GrayRobinson, P.A.; Michael J. Colitz, III (57) ABSTRACT

A device that produces linear motion by sequentially and in a continuous sequence accelerating inertial thrust masses at well-defined times towards the axis of counter-rotating disks. The inertial thrust masses are contained in cavities placed equidistantly about the periphery of counter rotating capture disks mounted on a common axle. They are radially accelerated by a bi-directional impulse ramps that can be moved to any position around the periphery of the counter rotating capture plates and into and out of the paths of the gyrating thrust masses to any desired depth within the mechanical range of the impulse ramps which simultaneously engage and radially accelerate the inertial thrust masses of each counter-rotating capture plate. The counter-rotating capture plates are each separately driven by a gear assembly powered by an external engine or motor that powers the rotation of the disks. Each radial acceleration of the inertial thrust masses produces an impulse of force that pushes against the mass accelerator with a force equal to the force used to radially accelerate each thrust mass. Each impulse is a vector force and imparts motion along the chosen vector to any object to which the device is attached.

8 Claims, 9 Drawing Sheets

(56) References Cited

U.S. PATENT DOCUMENTS

| | | | |
|---|---|---|---|
| 5,269,201 | A | 12/1993 | Uematsu |
| 5,388,470 | A | 2/1995 | Marsh, Jr. |
| 5,747,801 | A | 5/1998 | Quarmby et al. |
| 5,809,835 | A | 9/1998 | Beim et al. |
| 6,336,372 | B1 | 1/2002 | Ogami et al. |
| 6,374,686 | B1 | 4/2002 | Weston |
| 6,375,592 | B1 | 4/2002 | Takahashi et al. |
| 6,375,594 | B1 | 4/2002 | Wafzig |
| 2006/0005644 | A1 | 1/2006 | Weaver |
| 2006/0213293 | A1 | 9/2006 | Lasch et al. |
| 2007/0295164 | A1 | 12/2007 | Tavarez |
| 2008/0121071 | A1 | 5/2008 | Plews |

OTHER PUBLICATIONS

Jefferts, S.R. et al., Coaxial-resonator driven rf (Paul) trap for strong confinement, Physical Review, Apr. 1995, pp. 3112-3116, vol. 51, No. 4.

Monroe, C. et al., Resolved-Sideband Raman Cooling of a Bound Atom to the 3D Zero Point Energy, Physical Review Letters, Nov. 27, 1995, vol. 75, No. 22.

Philip Yam, Bringing Shrodinger's Cat to Life, Trends in Physics, Jun. 1997, pp. 104-109, Scientific American.

PROPULSION SYSTEM

RELATED APPLICATION DATA

This application claims priority to and is a continuation-in-part of application Ser. No. 11/514,405 filed on Aug. 30, 2006, now U.S. Pat. No. 8,863,597, issued Oct. 21, 2014, and entitled "Stardrive Propulsion System," the contents of which are fully incorporated herein for all purposes.

BACKGROUND OF THE INVENTION

Field of Invention

The present invention relates to an impulse device and more particularly pertains to mounting freely movable masses about the periphery of counter rotating circular capture plates which are in turn mounted onto a main rotational axis drive shaft, whereby energy is provided to cause the circular capture plates to counter rotate, while having the ability to move the freely movable masses radially toward and away from the axis of rotation. The invention further relates to a new method of converting rotational energy, as generated by an engine or motor, into linear motion.

Description of the Related Art

Current terrestrial transportation technologies use a variety of mechanisms to convert the rotational energy generated by the engine or motor contained within the vehicle into the linear motion of the vehicle. In the automotive world there are three basic forms of the mechanical device generally known as a transmission that is connected to the motor/engine and in turn itself is connected to a drive shaft and gear assembly that ultimately attaches to the drive wheel(s) (the drive train) to produce the motion of the vehicle. The three basic varieties of an automotive transmission are manual, automatic and continuously variable, with the manual transmission generally being the most efficient form for transmitting the motor/engine power to the drive wheel(s).

In aircraft the choices for converting engine power output into vehicle motion are propellers and jet engine thrust from jet engines such as turbofan engines or turbojet engines. Aircraft propeller efficiency varies according to the shape of the propeller and the angle of incidence of the propeller. In every case the amount of energy used to spin the propeller is significantly greater than the amount of thrust produced. Jet engine efficiency similarly suffers losses between the input of the fuel's energy and the output of the thrust energy. Moreover, propeller aircraft suffer significant efficiency losses as altitude increases.

Marine propellers have thrust to input power ratios similar to aircraft propellers with the additional problem of corrosion and encrustation thrust losses not suffered by aircraft propellers.

Accordingly, there existed a need for a highly efficient device that would solve the problems of fuel inefficiency, excess energy consumption and reduce friction wear of operable parts. In this regard, the present invention substantially fulfills this need.

Prior patented devices have exploited the relationship between the radius of the gyration of movable weights, the centripetal force required to maintain a constant radius of the gyration of movable weights and the effect that varying the radius has on the overall energy balance of the system. By way of example, the prior art includes U.S. Pat. No. 3,968,700. In U.S. Pat. No. 3,968,700 the inventor in his abstract stated that his device " . . . relates to new and useful improvements in devices that convert the centrifugal forces produced by rotating masses into a propulsive force acting in one direction and which is comprised of a movable supporting structure in which identical sets of masses rotate in opposite directions about an axis which is perpendicular to the desired direction of travel and a mechanism for continuously varying the radius of gyration of each mass during its cycle of revolution." The method employed in the device of the '700 patent to create and exploit differential centripetal accelerations and convert that difference into a linear force was to have two circular aspects of that device which had their respective centers offset slightly, one circular aspect being comprised of a bearing race and the other circular aspect consisting of an assembly having an axis that has radial arms extending from it and onto which radial arms are mounted masses that can move radially toward and away from the axis along the radial arms. Since in that device the bearing race center is offset from the radial arm center of rotation, when the movable masses gyrated about the offset circular bearing race, the angular velocity, and hence the centripetal acceleration, varied with the difference in those two values, resulting in a produced linear thrust vector. Further, the device in U.S. Pat. No. 3,584,515 similarly exploited the forces generated by varying the radius of a circle around which rotating masses were constrained to take. In U.S. Pat. No. 3,998,107 the same concept of varying the radius of the circle about which masses are rotated to produce a difference from one point to another of the amount of centripetal force generated is also exploited. In the device of the '107 patent, the entire inner housing which contained the movable thrust masses, the cylinders in which the movable masses were contained and the associated connecting rods were caused to rotate about a stationary, crank like shaft that itself could be moved to vary the direction of the resulting centripetal acceleration difference that was induced by varying the radius of gyration. It could not change the magnitude of the resulting thrust vector other than by changing the velocity of gyration. In these cases the direction of the desired thrust vector is fixed by the particular design of the device, or the thrust vector magnitude is limited, or both.

U.S. Pat. No. 3,807,244 and U.S. Pat. No. 2,009,780 are other examples of such devices. In the patents discussed above the direction of the desired thrust vector is fixed by the particular design of the device, or the thrust vector magnitude is limited, or both.

Therefore, it can be appreciated that there exists a continuing need for a new and improved device which can be used to exploit the relationship between the radius of the gyration of movable weights, the centripetal force required to maintain a constant radius of the gyration of movable weights and the effect that varying the radius has on the overall energy balance of the system, without limiting or fixing the directional movement of the thrust vector to the design of the device.

BRIEF SUMMARY OF THE INVENTION

After extensive study of various inertial systems, the present inventor discovered that conventional means of converting the input energy of an engine or motor into thrust that propelled a vehicle could be eliminated. Specifically, it is the object of the present invention to provide a more useful alternative to automotive transmissions and drive trains, aeronautical and marine propellers and for on orbit uses, a more useful alternative to reaction wheels, ion and chemical thrusters.

Accordingly, a primary purpose of the propulsion drive is to use a movable ramp to sequentially and in a continuous sequence accelerate the gyrating inertial thrust masses towards the axis of the counter-rotating disks and thereby translate kinetic energy to the device. Basically, the device exploits the inertial mass and rotational energy of the radially freely movable masses and generates linear motion of the entire device and any object to which the device is affixed. As such, the general purpose of the present invention is to make things move in any desired direction via the reaction force applied to the acceleration ramps and translated to the impulse drive plate, which is attached to a vehicle, with the direction of movement determined by the direction of the impulse body control arm which is under the control of the vehicle's operator.

To attain the linear motion of the device, the present invention essentially comprises an arrangement of freely movable inertial thrust masses that are constrained to move in a circle at high speeds but which also have the ability to freely move radially toward and away from the axis of rotation. The movement of these masses toward the rotational axis is induced mechanically through ramps that increase the inertial thrust mass's centripetal acceleration at sites about the circumference of the circle about which the movable inertial thrust masses are spun. This induced asymmetrical additional centripetal acceleration, by the operation of Newton's Third Law of motion, produces an oppositely directed reaction force in the device, which is the source of the desired thrust. The counter-rotating capture plates and inertia thrust masses negate imparting any angular momentum to the device. The number of the movable masses, elsewhere referred to herein as inertial thrust masses, and the number of impulse ramps or other similarly functioning devices, as well as the size of the circle about which the inertial thrust masses move and the speed of rotation, can be varied to fit the specific application under contemplation. As the invention is mechanical in nature, a conventional oiling system is required, as well as an enclosing shell that protects the moving parts from contamination and collects and reuses the oil.

Energy to rotate the movable inertial thrust masses and actuate the impulse ramps is externally supplied, thus complying with the conservation of energy laws. The bi-directional impulse ramps are powered externally or internally by commercially available electric motors. In the version described herein it is contemplated that a single, external source us used to provide all needed power to the invention's counter rotating drive discs. The mass impulse ramps can be controlled to fit the performance needs of the operator. Since the inertial thrust mass impulse ramps may be positioned anywhere to intercept the motion of the thrust masses about the periphery of their circular motion, the thrust vector produced can be varied at the direction of the operator. Since there are few moving parts that move against other component parts, friction is minimized. As the thrust that is produced by the invention can cause any device to which the invention is attached to move, and the inherent inefficiencies of automotive drive trains and propellers are avoided. Since the inertial thrust masses are continuously reused, the device does not run out of propellant as is the case with ion or chemical thrusters.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the Figures. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is therefore an object of the present invention to reduce power loss and increase energy efficiency when converting the energy generated by the engine/motor into linear motion.

It is an object of the present invention to provide an impulse drive that may be easily and efficiently manufactured and marketed.

A further object of the present invention to provide environmental benefits resulting from increased energy efficiency in the transportation industry.

Another object of the present invention is to provide economic benefits resulting from the reduced cost of production of the invention as compared to the cost of the production of automotive drive trains.

A further object of the invention is operator control of the device for control of the direction and magnitude of the induced linear thrust vector.

Still another object of the invention is to use movable bi-directional acceleration ramps to change the length of the radius of the circle followed by the inertial thrust masses at one or more locations around the circumference of the circular path followed by the inertial thrust masses, such that when the acceleration ramps are moved into the paths of the gyrating inertial thrust masses, the length of the radius of the circle being followed by the inertial thrust masses is shortened.

A further object of the invention is to increase the centripetal force generated in the device as the speed of gyration of the thrust masses is decreased in proportion to the amount of radial acceleration and the change in the length of the radius of the circle being followed by the inertial thrust masses when the movable bi-directional acceleration ramps are moved into the path of the gyrating inertial thrust masses.

Another application of the device is in space. Current space craft, including commercial satellites, use chemical rockets for propulsion or ion propulsion (one U.S.A. ion propulsion craft has been successful as of the date hereof, the Deep Space One). Since the fuel of the rocket is also the reaction mass which is consumed by the process of generating thrust, once the fuel is exhausted the useful life of the satellite or space craft is ended. The present invention has no such limitation as the reaction mass of the invention consists of the freely movable thrust masses which are retained and reused. So long as a power supply such as solar panels or radioisotope thermoelectric generators (RTGs) can provide electrical energy to a motor to power the invention, thrust is available to stabilize satellites in orbit or to propel space craft as needed or desired.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying Figure and descriptive matter in which there is illustrated one of the embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts through the several views of the drawings.

DETAILED DESCRIPTION OF THE INVENTION

Figure 1:
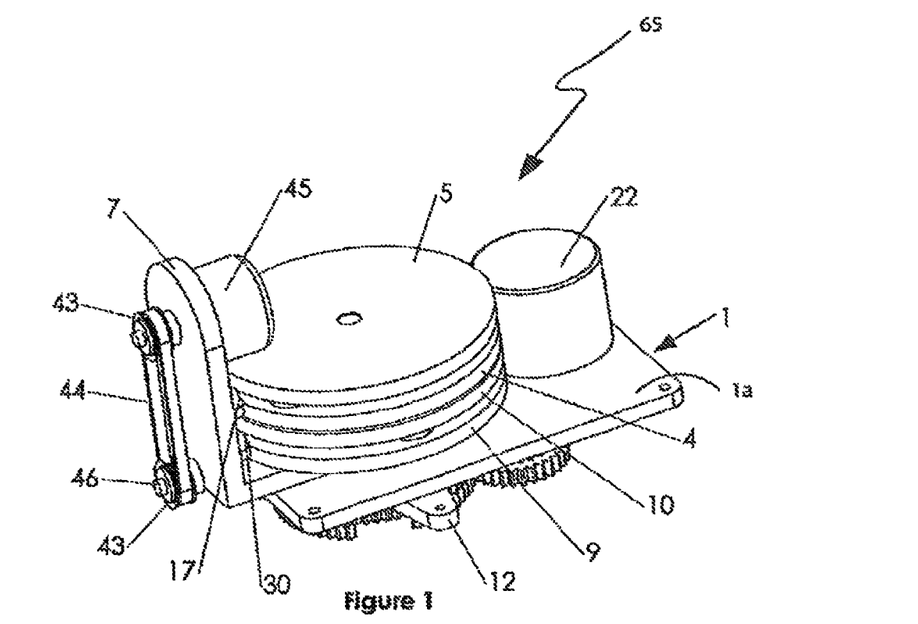
FIG. 1 is an upper perspective illustration of the preferred embodiment of the stardrive propulsion system constructed in accordance with the principles of the present invention.
Figure 2:
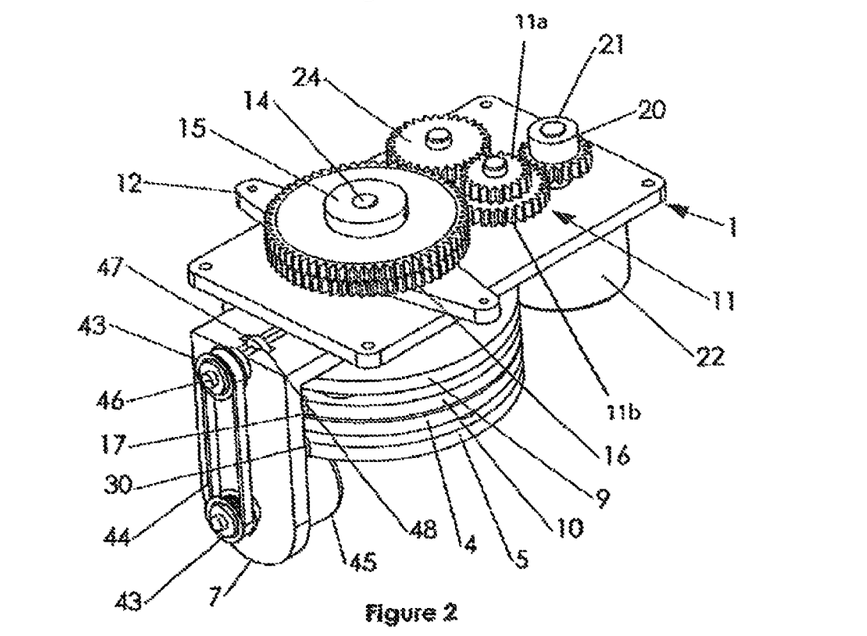
FIG. 2 is a lower perspective illustration of the preferred embodiment of the stardrive propulsion system constructed in accordance with the principles of the present invention.

With reference now to the drawings, and in particular to FIGS. 1 and 2 thereof, a stardrive propulsion system embodying the principles and concepts of the present invention and generally designated by the reference numeral 65 will be described.

The present invention, stardrive propulsion system, is comprised of a plurality of components. Such components in their broadest context include an impulse body, impulse ramps, a ramp position motor, impulse drive plate, an upper and lower counter-clockwise capture plates, an upper and lower clockwise capture plates, inertial thrust masses and a motor. Such components are individually configured and correlated with respect to each other so as to attain the desired objective.

More specifically, the present invention includes a propulsion device for creating linear motion by applying a fixed mechanical interference, the impulse ramps, to absorb a portion of the kinetic energy as the momentum of rotating inertial thrust masses is diverted by the fixed mechanical interference, within a closed system. The device includes a plurality of capture plates 9, 10, 14 and 15. The capture plates have a plurality of capture slots 19 that are equidistantly spaced about the periphery of each of respective the capture plates. The plurality of capture plates includes a pair of counter-clockwise rotating capture plates and a pair of clockwise rotating capture plates. The pair of counter-clockwise capture plates are made by a lower counter-clockwise capture plate 4 and an upper counter-clockwise capture plate 5. The pair of clockwise capture plates are made by a lower clockwise capture plate 10 and an upper clockwise capture plate 9.

Also, a plurality of capture plate gears is included. The plurality of capture plate gears includes a motor drive gear 20, a tandem intermediate drive gear 11, a tandem reversing gear 24, a clockwise capture plate gear 16, and counter-clockwise capture plate gear 15. The tandem intermediate drive gear has an upper gear part 11a and a lower gear part 11b. The upper gear part meshes with the tandem reversing gear which meshes with the counter-clockwise capture plate gear which is connected to one of the pair of capture plate shafts for rotation of the lower counter-clockwise capture plate and the upper counter-clockwise capture plate. The lower gear part meshes with clockwise capture plate gear which is connected to another of the pair of capture plate shafts for rotation of the lower clockwise capture plate and the upper clockwise capture plate.

The plurality of capture plates and the plurality of capture plate gears are mounted to an impulse drive plate 1. The impulse drive plate has a first side 1a and a second side 1b, with the plurality of capture plates being mounted on the first side of the impulse drive plate and the plurality of capture plate gears being mounted to the second side of the impulse drive plate. The plurality of capture plates are in rotational communication with the plurality of capture plate gears by way of a pair of co-axial capture plate shafts. The pair of capture plate shafts includes a counter-clockwise capture plate shaft 14 and a clockwise capture plate shaft 13.

Further, a plurality of inertial thrust masses are positioned within corresponding capture slots of the plurality of capture plates. In this embodiment of the device the upper and lower counter-clockwise capture plates have at least three inertial thrust masses 2 positioned with capture slots. The upper and lower clockwise capture have at least three inertial thrust masses 3 positioned with capture slots. The inertial thrust masses move freely within the capture slots.

An impulse body 7 is mounted to the first side of the impulse drive plate and is spaced from the plurality of capture plates. The impulse body has a plurality of impulse ramps 17 and 30. The impulse ramps are sized to be placed between the plurality of capture plates for engagement of the plurality of inertia thrust masses positioned within the capture slots of the capture plates. Additionally, the impulse body includes two pulleys 43. One of the pulleys is connected to a ramp position motor drive shaft 45a and the other pulley is connected to a ramp position screw shaft 46. A drive belt 44 is used to transfer rotational motion from the one pulley connected to the ramp position motor drive shaft to the other pulley connected to the ramp position screw shaft. A ramp position motor 45 is connected to the ramp position motor drive shaft and mounted on the impulse body. The rotational motion generated by the ramp position motor will cause the ramp position screw 50 to be driven fore and aft for movement of the impulse body and thereby changing the position of the impulse ramps between the plurality of capture plates.

In this embodiment of the device a motor 22 is mounted to the impulse drive plate. The motor receives its power from the vehicle in which the impulse drive plate is mounted thereon. Once the motor is activated, the plurality of capture plate gears is rotated and will in turn rotate the plurality of capture plate shafts. The rotation of the two capture plate shafts causes rotation of the capture plates for clockwise and counter-clockwise rotation of the plurality of inertial thrust masses within the capture slots with the rotating plurality of inertial thrust masses making contact with the impulse ramps. The force that is transmitted to the impulse drive plate is caused by the radial acceleration of the inertial thrust masses by the impulse ramps and causes movement in the direction determined by the movement of an impulse body control arm which is under the control of the vehicle's operator. Simply stated, energy is transferred to the impulse body 7 from the acceleration of the inertial thrust masses 2 and 3 when they pass over and are radially accelerated by their respective impulse ramp, and is transferred to impulse drive plate 1.

For the purposes of this application vehicle is defined as any man made means of transportation that is mechanized.

Referring to FIGS. 1 and 2, impulse drive plate 1 is the mechanism mounting substrate. Motor 22 is connected to impulse drive plate 1 and provides rotation power (referring to FIGS. 3 and 4) through motor drive shaft 21, resulting in the clockwise rotation of motor drive gear 20. Motor drive gear 20 meshes with tandem intermediate drive gear 11. The tandem intermediate drive gear 11 is a single part that has a upper gear part 11a and a lower gear part 11b. The upper gear part 11a of tandem intermediate drive gear 11 meshes with tandem reversing gear 24. The lower gear part 11b of tandem intermediate drive gear 11 meshes with clockwise capture plate gear 16. Tandem reversing gear 24 meshes with counter-clockwise capture plate gear 15. Counter-clockwise capture plate gear 15 is an all in one piece gear and hub that is either built as a one piece or pressed together by glue or other means to be one piece. The rotation of lower counter-clockwise capture plate 4 and upper counter-clockwise capture plate 5 is driven by means of counter-clockwise capture plate shaft 14 connected to counter-clockwise capture plate gear 15. The rotation of lower clockwise capture plate 9 and upper clockwise capture plate 10 is driven by means of clockwise capture plate shaft 13, connected to clockwise capture plate gear 16. Clockwise capture plate shaft 13 is coaxial to counter-clockwise capture plate shaft 14. As motor 22 applies rotational power to the system, inertia thrust masses 3 move in opposite centrifugal orbits relative to inertia thrust masses 2.

Figure 6:
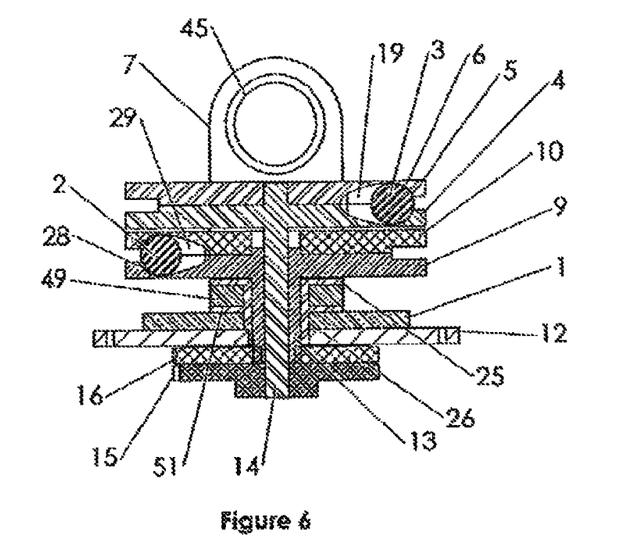
FIG. 6 is a sectional view taken along lines 6-6 of FIG. 5.
Figure 7:
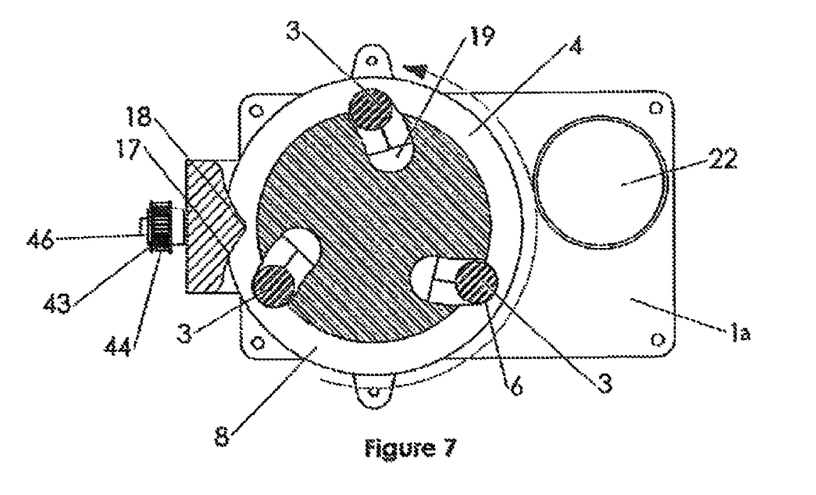
FIG. 7 is a sectional view taken along lines 7-7 of FIG. 5A to show the area below upper capture plate 5.

Referring to FIG. 7, a plurality of inertia thrust masses 3 is captured in capture slot 19 formed by lower counter-clockwise capture plate 4 and upper counter-clockwise capture plate 5 as shown on FIG. 6. This plurality of inertia thrust masses 3 are equally spaced along centrifugal path 41 as shown on FIG. 10, at a velocity and counter-clockwise rotation that causes these masses to be thrown to the outside limits of capture slot 19 by centrifugal force. Inertia thrust mass 3 centrifugal diversion is limited by mass retainer surface 6, located on the distal end of capture slot 19. A portion of inertia thrust mass 3 is allowed by mass retainer surface 6 to extend into upper impulse ramp slot 8.

Figure 8:
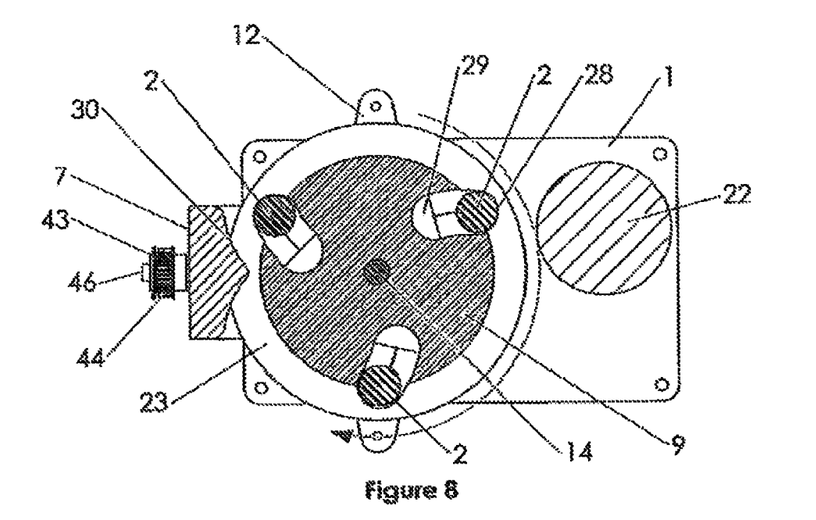
FIG. 8 is a sectional view taken along lines 8-8 of FIG. 5A to show the area below the upper clockwise capture plate 10.

Referring to FIG. 8, a plurality of inertia thrust masses 2 is captured in capture slot 19 formed by lower clockwise capture plate 9 and upper clockwise capture plate 10, as shown on FIG. 6. This plurality of inertia thrust masses 2 are equally spaced along centrifugal path 41 as shown on FIG. 10, at a velocity and clockwise rotation that causes these masses to be thrown to the outside limits of capture slot 29 by centrifugal force. Inertia thrust mass 2 centrifugal diversion is limited by mass retainer surface 28, located on the distal end of capture slot 29. A portion of inertia thrust mass 2 is allowed by mass retainer surface 28 to extend into lower impulse ramp slot 23.

Figure 10:
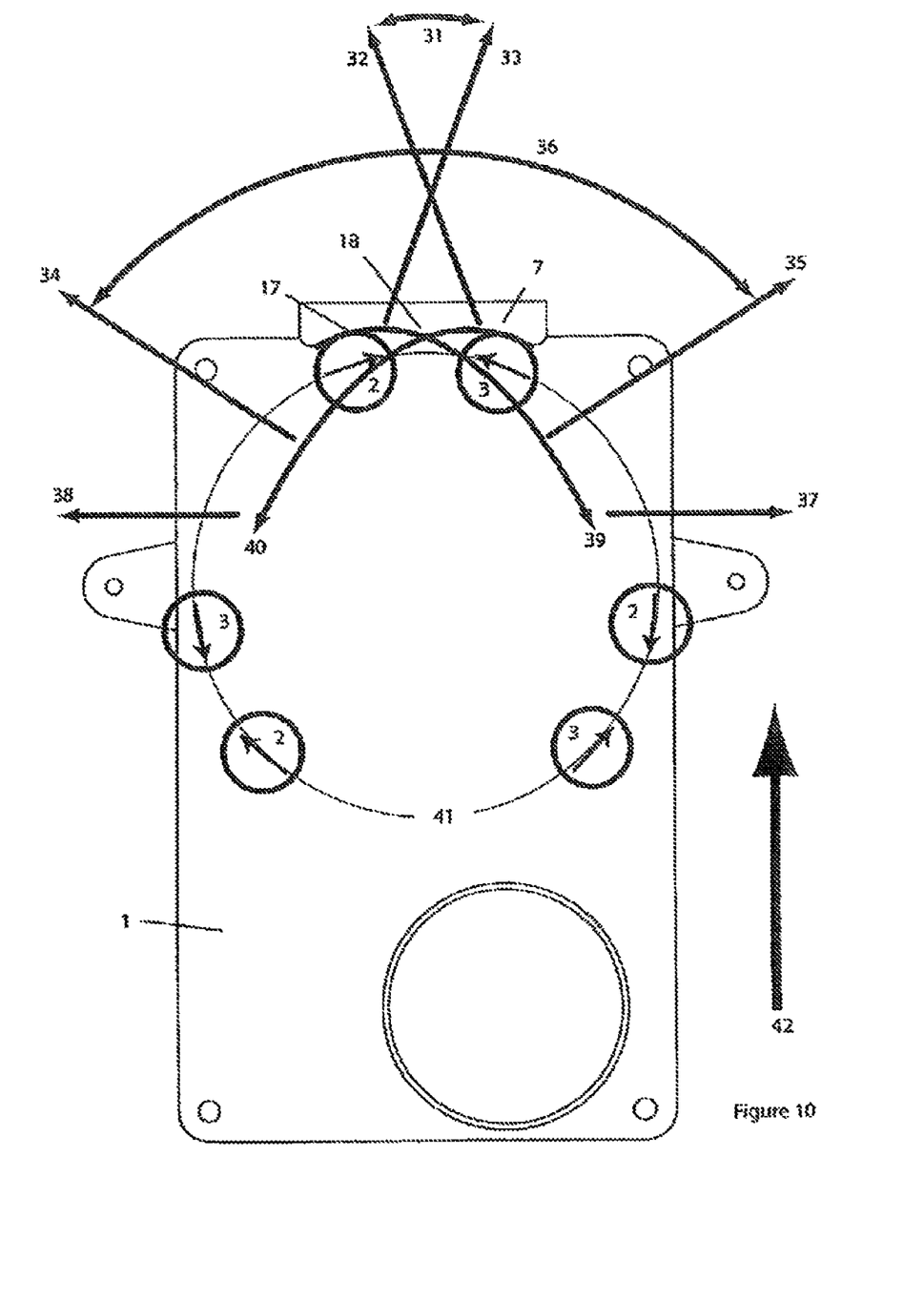
FIG. 10 is a perspective view illustration the vectors of motion of the present invention.

Referring to FIG. 10, as inertia thrust mass 2 and inertia thrust mass 3 contacts impulse body 7, the direction of the masses is diverted by impulse ramp 17 and 30, inducing forces by causing resultant vector 32 and resultant vector 33 in vector convergence zone 31 to converge. The impulse vector is collinear as inertia thrust mass 2 and inertia thrust mass 3 reach impulse apex 18. This creates the maximum force to impulse drive plate 1, by means of impulse translation from impulse apex 18 into the impulse body 7 as shown in FIG. 4, and through impulse body bushing 25, through impulse drive plate 1, causing an induced motion vector 42.

Referring to FIG. 10, as inertia thrust mass 2 and inertial thrust mass 3 pass impulse apex 18, the force of the masses continues as two opposing and divergent vectors 34 and 35 in vector divergent zone 36 on an Inertial thrust mass path 39 and 40, as defined by the angle of inertial thrust mass 2 and inertial thrust mass 3. Referring to FIG. 6, inertial thrust mass 2 and inertial thrust mass 3 is recaptured by capture slot 29 and capture slot 19. The recapture vector 37 and 38 forces cancel, and do not cause any reactive force to be applied to induced motion vector 42.

Figure 4:
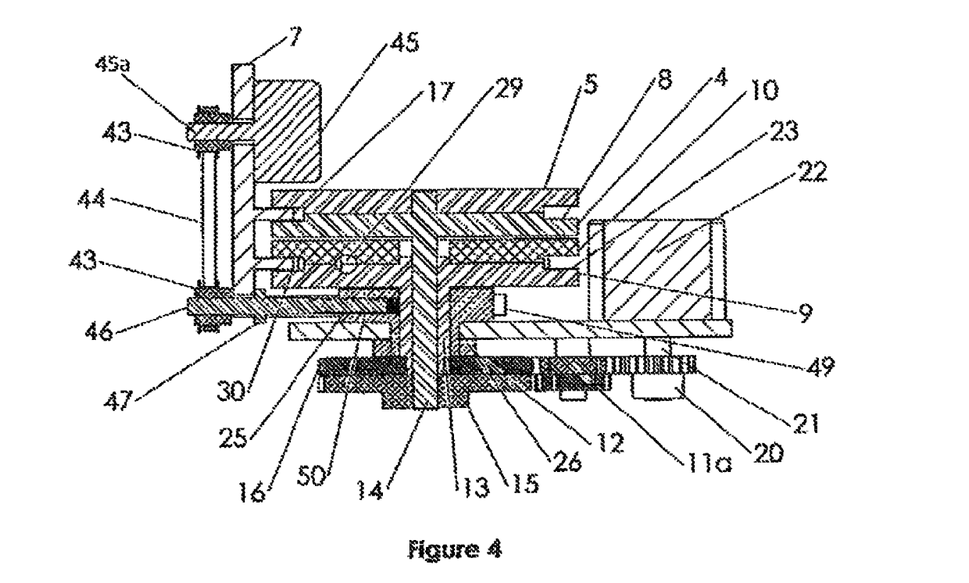
FIG. 4 is a cross-sectional view taken along lines 4-4 of FIG. 3.
Figure 5:
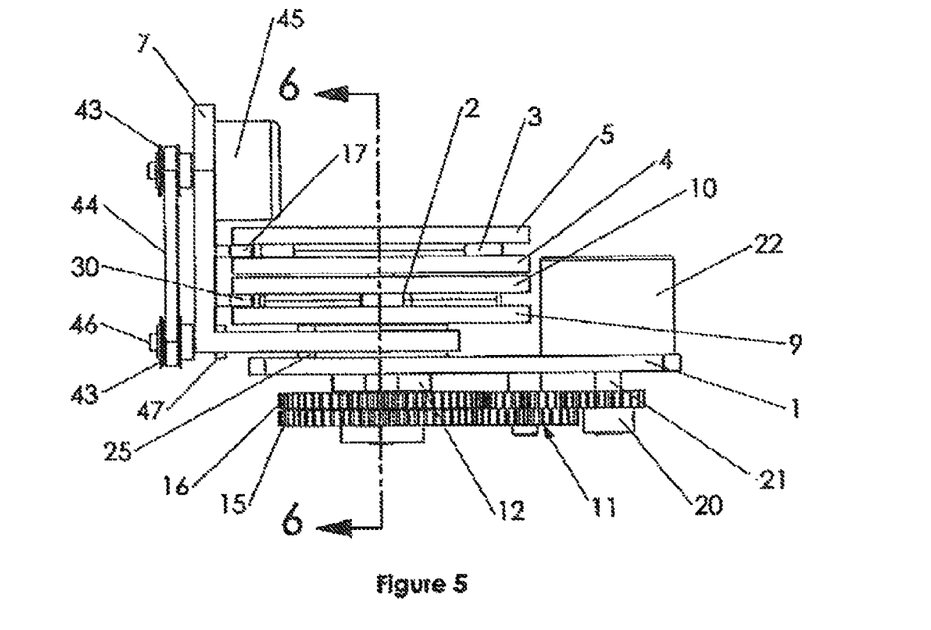
FIG. 5 is a right side view of the present invention of FIG. 1.
Figure 5A:
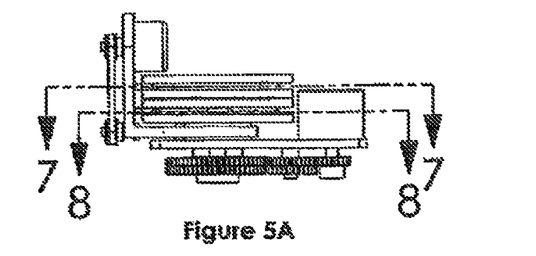
FIG. 5A is a secondary right side view of the present invention.

Referring to FIG. 4, the force can be regulated by the contact of inertial thrust mass 2 and inertial thrust mass 3 relative to the position of impulse ramp 17 and 30, by increasing or decreasing the diverted path of these inertial thrust masses. The impulse ramps 17 and 30 act as fixed mechanical interferences that translate energy to impulse drive plate 1 by absorbing a portion of the kinetic energy as the momentum of the inertial thrust masses 2 and 3 is diverted by the impulse ramps. This is done by moving the position of Impulse body 7, thereby positioning the impulse ramp 17 and 30 in lower impulse ramp slot 23 and upper impulse ramp slot 8, relative to the center or rotation of the inertial thrust masses. Ramp position motor 45 drives and power transmission assembly composed of two pulleys 43 and drive belt 44 to transfer rotational motion to ramp position screw shaft 46. The ramp position motor is connected to a control system within the vehicle that can be manually or remotely operated. Specifically, one of the pulleys is connected to a ramp position motor drive shaft 45a and the other pulley is connected to ramp position screw shaft 46. The drive belt 44 is used to transfer rotational motion from the one pulley connected to the ramp position motor drive shaft to the other pulley connected to the ramp position screw shaft 46. This motion allows ramp position screw 50 to be driven fore and aft, relative to the center or rotation of the inertial thrust masses, by means of impulse body bushing 25.

Figure 3:
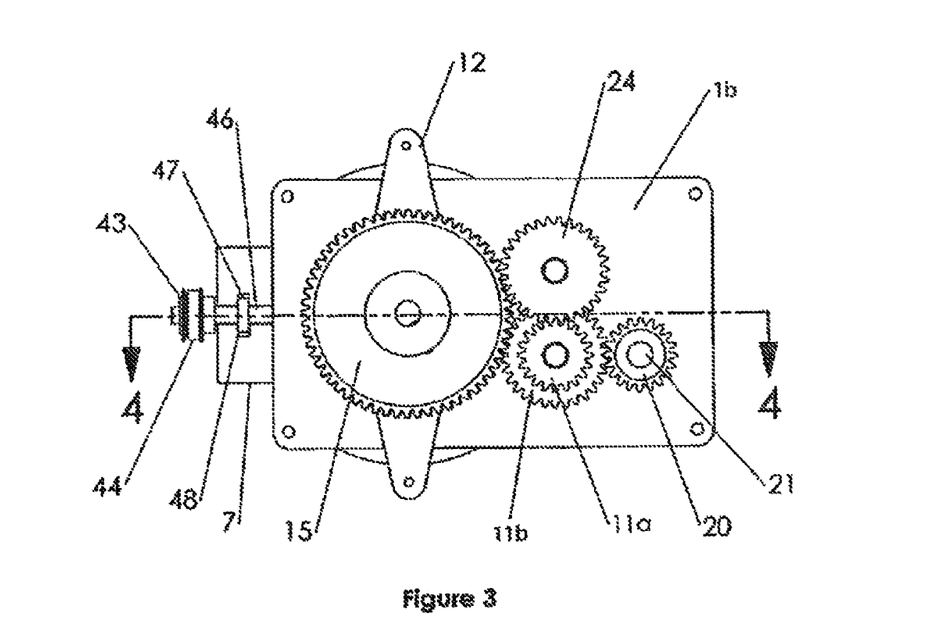
FIG. 3. is a plan view of the lower side of the present invention.

Referring to FIG. 3, ramp position screw shaft 46 is retained in impulse body 7 by ramp shaft retainer 47, captured in ramp shaft retainer slot 48. Referring to FIG. 6, impulse body 7 is held in place and slides fore and aft relative to the center or rotation of the inertial thrust masses, by means of impulse body forks 49 captured by impulse body retaining slot 51, located in impulse body bushing 25.

Figure 9:
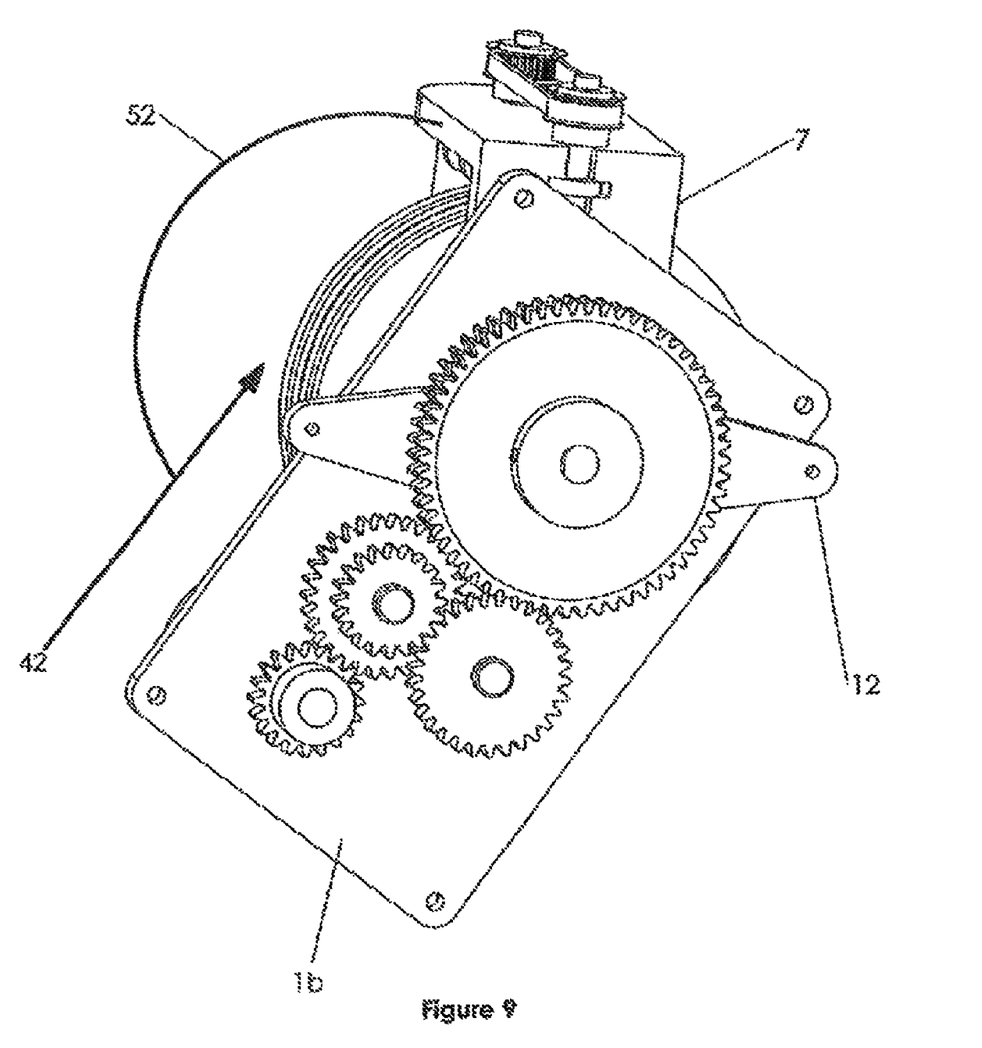
FIG. 9 is an elevational view of the present invention showing the lower side.

Referring to FIG. 9, impulse body control arm 12 is keyed to impulse body 7 and pivots in the impulse driven plate aperture 26 as shown on FIG. 6. Impulse body control arm is connected to the steering mechanism of the vehicle. Movement of the impulse body control arm 12 changes the impulse vector angle 52 of the impulse body 7 relative to impulse drive plate 1. This angular movement changes the induced motion vector 42 relative to impulse drive plate 1, allowing directional control of forces.

Alternative Embodiments

An alternative embodiment of the present invention is disclosed in FIGS. 11-15. This embodiment is the same in most respects to the primary embodiment discussed above. However, as noted below, the thrust masses are not spherical. Rather, the masses are formed from weighted plates that travel on opposing rollers. Additionally, springs are included to urge each of the thrust masses into an extended orientation relative to the capture discs. This ensures that the thrust masses are exposed and contact the impulse ramp upon rotation. This has the effect of increasing the linear thrust generated by the device. This embodiment is more fully described hereinafter.

As with the primary embodiment, device 110 includes a drive plate 112 upon which a number of the device components are mounted. Drive plate 112 includes both forward and rearward ends. Drive plate 112 supports both an electric motor 114 and an impulse ramp 116. Impulse ramp 116 is preferably formed adjacent the forward end of drive plate 112. Additionally, impulse ramp 116 preferably has an upper extent adjacent the upper capture plates and a lower extent adjacent the lower capture plates. As more fully explained above, ramp 116 may be adjustable to selectively alter both the magnitude and orientation of the forces generated by device 110.

Figure 11:
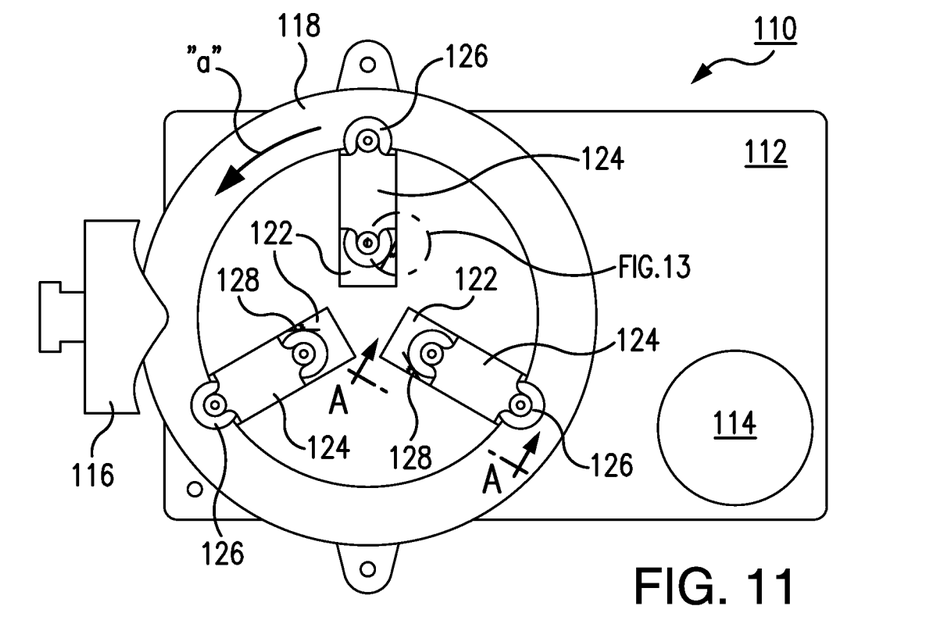
FIG. 11 is an alternative embodiment of the present invention.

With specific reference to FIG. 11, device 110 includes a pair of upper capture plates 118. Each plate of the pair is identical so only one is shown for clarity. As noted in the cross sectional view of FIG. 4, upper plates 118 are placed in facing relation with one another, with a series of equally spaced radial slots 122 formed therebetween. Each slot 122 houses an associated thrust mass 124. Any of a variety of configurations can be used for thrust masses 124. In the preferred embodiment, however, each thrust mass 124 takes the form of a weighted plate or body that is supported at either end by a roller 126. Rollers 126 allow the associated thrust mass 124 to travel within a slot 122. More specifically, thrusts masses 124 travel between a retracted position at the innermost extent of slot 122 and an extended position. In the extended position, the distal end of thrust mass 124 extends out of slot 122 and beyond the periphery of plates 118.

Figure 13:
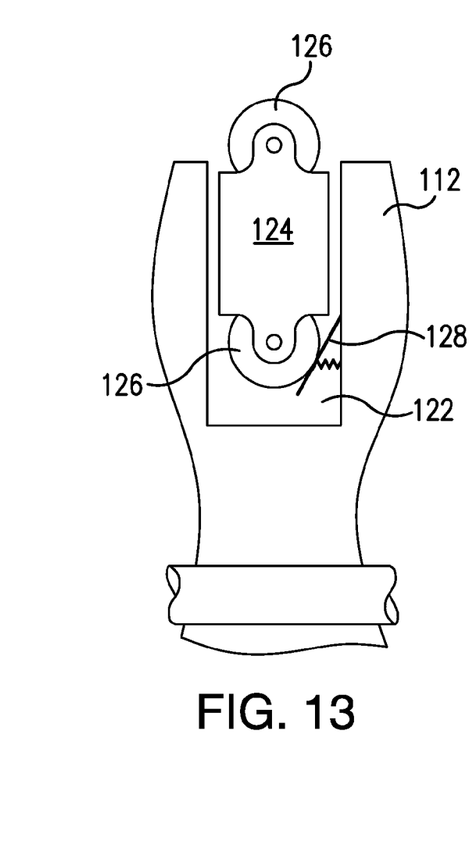
FIG. 13 is a detailed view of the alternative thrust mass of the present invention.
Figure 14:
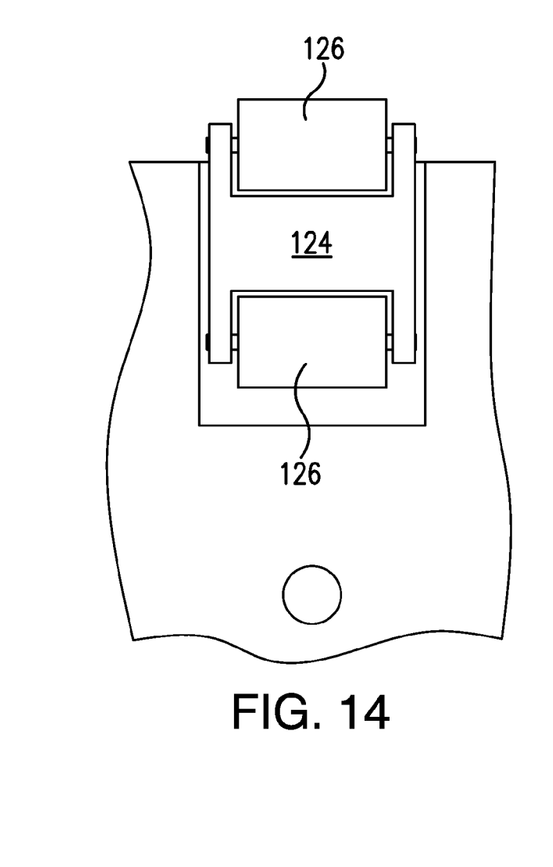
FIG. 14 is a view of the thrust mass taken along line A-A of FIG. 11.
Figure 15:
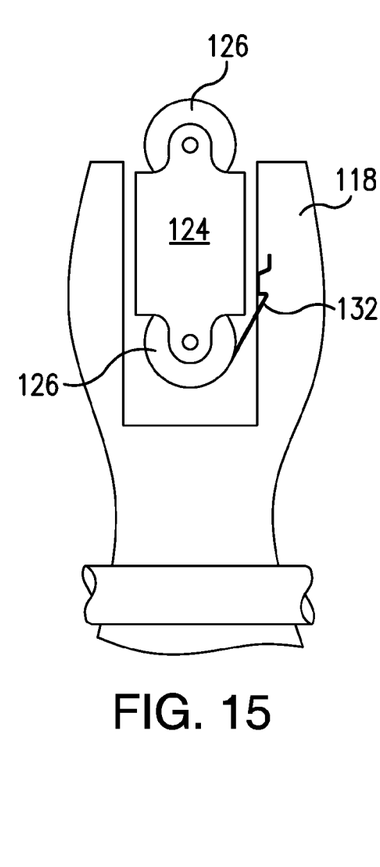
FIG. 15 is a detailed view of an alternative spring arrangement.

The respective thrust masses 124 are urged, or biased, into the extended orientation by way of a series of springs 128. Any of a variety of spring types can be used. FIG. 13 illustrates the use of a lever arm 128 and an associated coil spring. FIG. 15 illustrates the use of a leaf spring 132 with a first end that is mounted into the wall of the slot 122. Still yet other spring arrangements can be used. Regardless of the spring type, a spring is positioned within each of the radial slots 122. As illustrated in FIG. 13, spring 128 biases the corresponding thrust mass 124 into the second extended position. In use, motor 114, which is powered by a battery, or other source of electricity, functions to rotate the upper capture plates 118 and the associated thrust masses 124 in a first sense "a."

Figure 12:
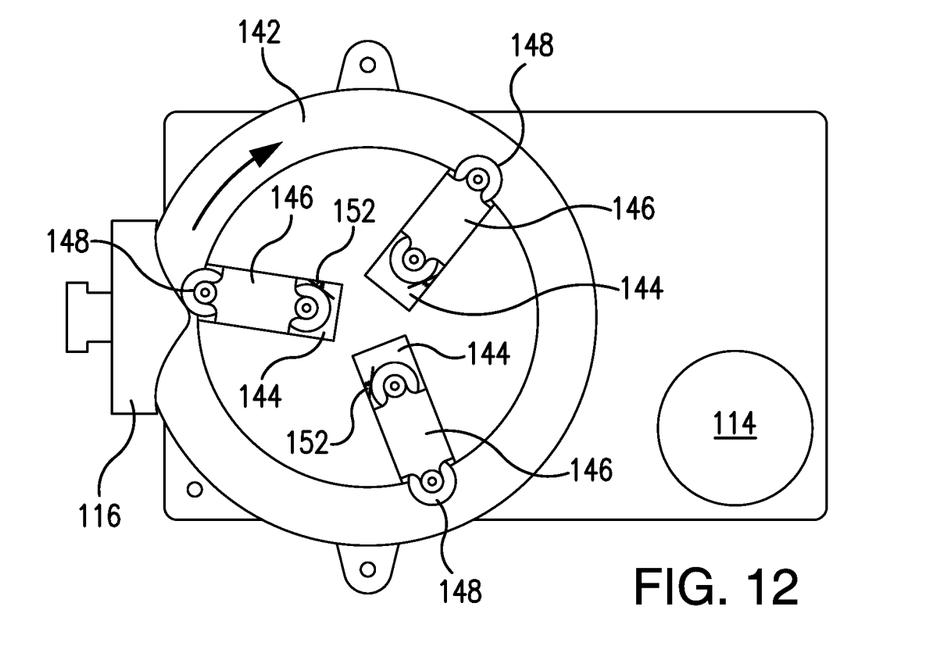
FIG. 12 is an alternative embodiment of the present invention.

FIG. 12 illustrates a pair of lower capture plates 142. A series of equally spaced radial slots 144 is likewise formed between lower capture plates 142. Each of the radial slots 144 houses a thrust mass 146, with each thrust mass 146 including opposing rollers 148 to allow the thrust mass 146 to move between the retracted and extended positions. A spring 152 (which is the same construction as spring 128) is positioned within each of the radial slots 144. Spring 152 biases the corresponding thrust mass 146 into the second extended position. Again, motor 114 functions to rotate the lower capture plates 142 and the associated thrust masses 146 in a second sense "b" that is counter to first sense "a." In the preferred embodiment, three slots and three thrust masses are included in both the upper and lower sets of plates.

Figure 16:
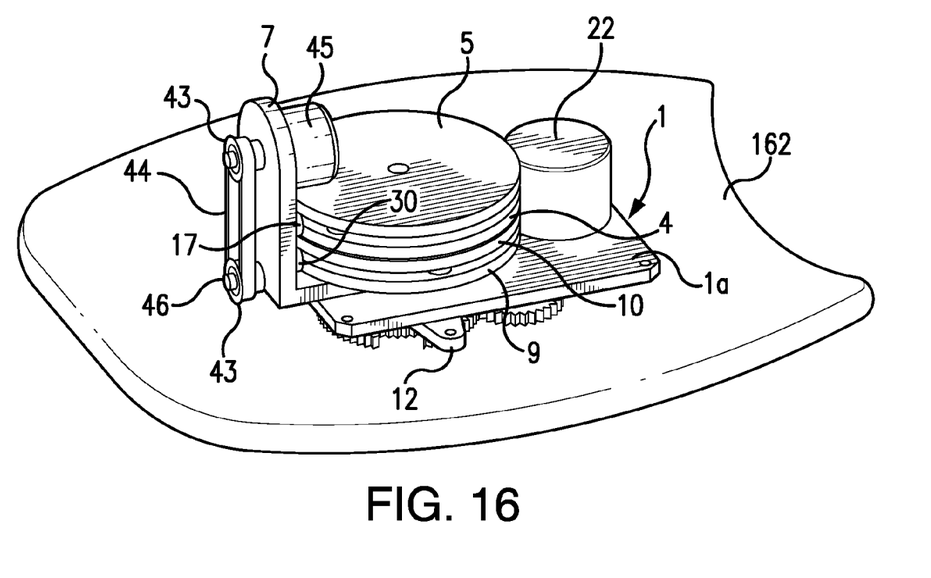
FIG. 16 is a view of the device mounted upon a buoyant vehicle.
Figure 17:
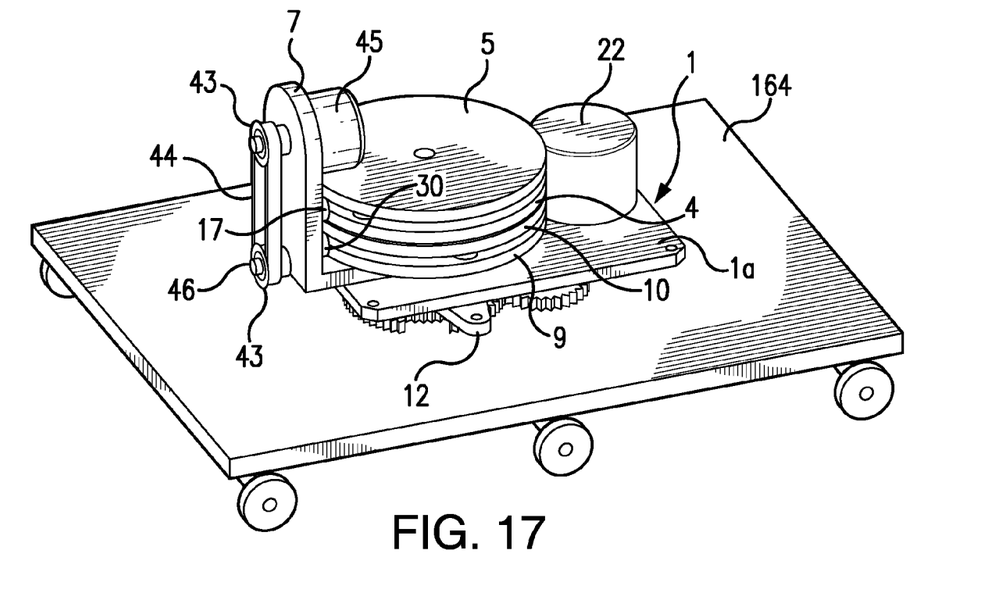
FIG. 17 is a view of the device mounted upon a wheeled vehicle.

The counter rotation ("a" vs. "b") of the upper and lower capture plates (118 and 142) causes the thrust masses (124 and 146) to sequentially impact impulse ramp 116. In this regard, the upper masses 124 contact the upper extent of ramp 116, while the lower masses 146 contact the lower extent of ramp 116. Each of these collisions forces the corresponding thrust mass (124 and 146) into the retracted position. Notably, the impact with ramp 116 forces the thrust masses (124 and 146) into the retracted position over the bias of the corresponding springs (128 and 152). As a result, an impulsive force is transferred to ramp 116 and plate 112 and a corresponding forward motion is generated. Finally, FIG. 16 shows the device of the present invention installed upon an inflatable or buoyant device 162. FIG. 17 shows the device mounted to a wheel based vehicle 164.

The particular embodiment of the invention herein described, which is but one of several ways that the counter rotating circular capture plates in which the inertial thrust masses are contained and are radially accelerated by a ramp to produce the desired thrust can be configured.

What is claimed is:

1. A device for converting rotary motion into forward linear motion, the device comprising:
   a drive plate having forward and rearward ends, the drive plate supporting an electric motor, an impulse ramp formed adjacent the forward end;
   a pair of upper capture plates, a series of equally spaced radial slots formed between the upper capture plates, each of the radial slots housing a thrust mass, each thrust mass including opposing rollers to allow the thrust mass to move between a retracted and an extended position, a spring positioned within each of the radial slots, the spring biasing the corresponding thrust mass into the extended position, the motor functioning to rotate the upper capture plates and the associated thrust masses in a first sense;
   a pair of lower capture plates, a series of equally spaced radial slots formed between the lower capture plates, each of the radial slots housing a thrust mass, each thrust mass including opposing rollers to allow the thrust mass to move between a retracted and an extended position, a spring positioned within each of the radial slots, the spring biasing the corresponding thrust mass into the extended position, the motor functioning to rotate the lower capture plates and the associated thrust masses in a second sense that is counter to the first sense;
   the counter rotation of the upper and lower capture plates causing the thrust masses to sequentially impact the impulse ramp, each impact forcing the corresponding thrust mass into the retracted position over the bias of the corresponding spring, whereby forward linear motion is generated.

2. The device as described in claim 1 wherein the springs are leaf springs.

3. The device as described in claim 1 wherein the spring is a coil spring with an associated lever arm.

4. The device as described in claim 1 wherein the drive plate is mounted to a vehicle.

5. The device as described in claim 4 wherein the vehicle is adapted to float on water.

6. The device as described in claim 4 wherein the vehicle includes wheels.

7. The device as described in claim 4 wherein the position of the impulse ramp is adjustable to alter the magnitude and direction of the forward linear motion.

8. The device as described in claim 4 wherein three equally spaced radial slots are included between each of the upper and lower capture plates.

\* \* \* \* \*